United States Patent Office 3,395,645
Patented Aug. 6, 1968

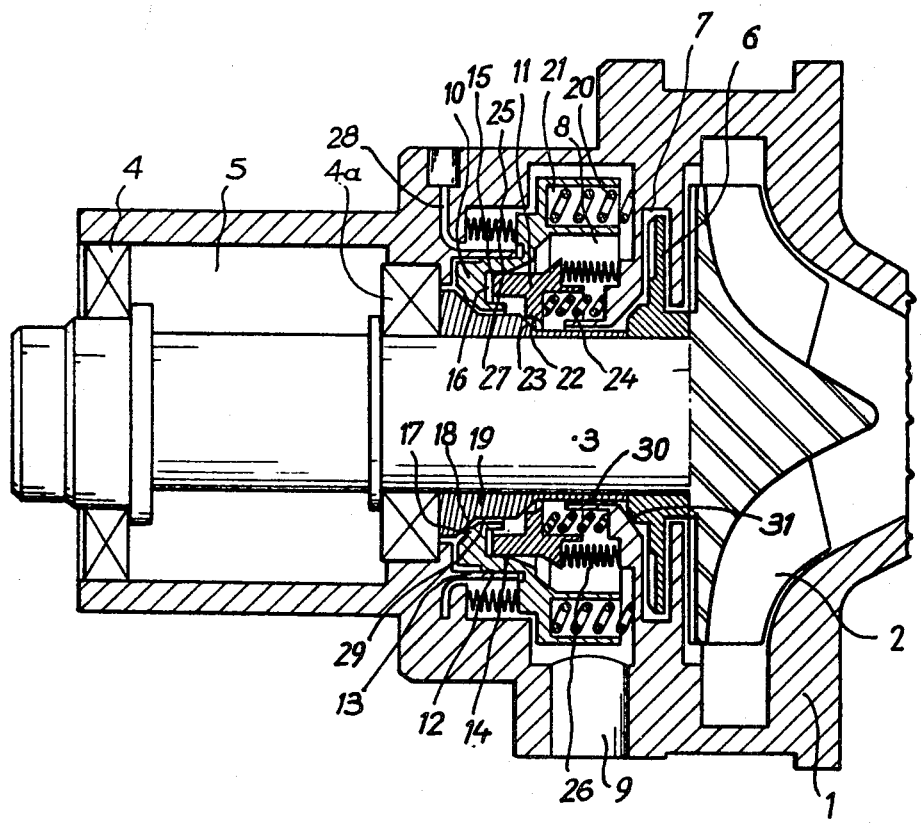

3,395,645
SHAFT SEAL ASSEMBLY
Andre Vilet, Sceaux, France, assignor to Societe d'Etude de la Propulsion Par Reaction (Societe Anonyme) Villejuif, France
Filed Sept. 6, 1966, Ser. No. 577,283
Claims priority, application France, Sept. 14, 1965, 31,398
8 Claims. (Cl. 103—111)

ABSTRACT OF THE DISCLOSURE

Sealing means for a shaft assembly to prevent the passage of fluid from a first zone to a second zone, comprising means between the zones rigid with the shaft defining a first sealing surface and additional means defining second, third, and fourth sealing surfaces. Resilient means biasing the second sealing surface into engagement with the first sealing surface are also provided along with further resilient means biasing the fourth sealing surface into engagement with the third sealing surface when the shaft is at rest. Fluid pressure means are utilized during shaft rotation to disengage the sealing surfaces, along with pump means between the zones attached to the shaft and operable when the shaft is rotating to create fluid pressure opposing the passage of fluid from the first to the second zone.

---

This invention relates to a shaft seal assembly.

According to the present invention there is provided in a shaft seal assembly for substantially preventing the passage of a fluid from a first zone to a second zone, means between said zones and rigid with the shaft defining a first sealing surface, means defining a second sealing surface, resilient means biasing the second sealing surface into engagement with the first sealing surface when the shaft is at rest, fluid pressure means operable during shaft rotation to disengage the said sealing surfaces, and pump means between said zones fast with said shaft and operable when the shaft is rotating to create fluid pressure opposing the passage of said one fluid from said one zone to said second zone.

Further according to the present invention there is provided in a shaft seal assembly for substantially preventing the passage of a fluid from a first zone to a second zone, a first generally annular member coaxial with the shaft and having an annular ridge, a second generally annular member coaxial with the shaft and disposed radially inwardly of the first member, said second member being capable of limited axial sliding movement relative to said first member and having an annular ridge, a casing surrounding said annular members, means defining two spaced generally annular sealing surfaces rigid with the shaft, resilient means biasing the respective ridges of the annular members into engagement with said sealing surfaces when the shaft is at rest, control means for overcoming the resilient means and disengaging said ridges from said sealing surfaces when the shaft is rotating, a fluid pump fast with said shaft arranged to discharge into said first zone and mounted for rotation relative to the casing with a clearance space, means defining a passage in communication with said clearance space, and an auxiliary pump fast with said shaft in said passage arranged to deliver fluid at at least the pressure in said clearance space.

The seal assembly proposed herein is intended for use where the rotary shaft passes through a partition separating two fluid media the nature and pressures of which may be different.

This sealing assembly may therefore be directly incorporated in mechanical assemblies such as the shafts of pumps, compressors, turbines and power take-offs on crankcases.

The principal distinguishing feature of the present invention is concerned with the modification of its sealing function according to whether the rotary member is moving or at rest; in both cases, the seal is derived from isolation of the mechanical parts associated with the rotary member from the fluid medium under pressure.

Further features of the invention will become apparent from the following detailed description of one embodiment thereof, given solely by way of example and without any limitation of scope being implied, in conjunction with the sole figure of the accompanying drawing, which is a longitudinal section of a centrifugal pump incorporating a seal in accordance with the invention.

The centrifugal pump shown in the drawing is intended for the high-pressure delivery of corrosive liquids and therefore must be kept leak-proof both when running and when at rest, so as to afford particularly effective protection to the special steels used for the pump-shaft bearings.

This pump comprises a pump body 1, in which is mounted a centrifugal rotor 2, fast with a drive shaft 3, which is journalled in ball bearings 4 and 4a, these being accommodated in a bore 5 within the pump body 1.

Adjacent pump rotor 2, a rotor 6 of a counter-pump, is housed within the pump body 1 in an annular recess 7, and is keyed to the shaft 3. The diameter of the rotor 6 and the clearances of the counter-pump are determined by the pressure conditions prevailing on the intake side, upstream of the rotor 2.

Between the counter-pump 6/7 and the bearing 4, an annular cavity 8 is provided in the pump body 1, and is in communication with a drainage passage 9.

Within the annular cavity 8 an assembly of relatively telescopic annular sealing members 10 and 11, is fitted concentrically about the shaft 3. The member 10 is free to slide axially on an internal cylindrical bearing face 12 provided by a sleeve 13 rigid with the pump body, while the member 11 is free to slide on the internal cylindrical bearing face 14 formed on a part 15 of the member 10. The part 15 has a shoulder 16 which acts as a stop for the member 11 when the seal is in operation.

An annular ridge 17 on the member 10 contacts an inclined bearing face 18 of a sleeve 19, which is fast with the shaft 3 and may be made of a plastics material.

The ridge 17 is biassed against the face 18 by resilient members in the form of helical compression springs 20, one end of each of which bears against a part of the pump body 1 and the other end of which bears against sealing member 10, which has recesses accommodating the springs.

An inwardly directed annular ridge 22 of the member 11 is biassed against a bearing face 23 of the sleeve 19 by resilient members in the form of helical compression springs 24, one end of which bears against a part of the pump body 1 and the other end against a part of the member 11.

Bellows 25 and 26 respectively form a seal between the member 10 and the pump body 1 and between the member 11 and the pump body 1.

A chamber 27 bounded by the bellows 25, the pump body 1 and the sealing member 10, is in communication with a passage 28, through which is introduced a hydraulic liquid or gas under pressure. This acts on the member 10, thrusting it in opposition to the action of the springs 20 and causing it to move axially, so that the ridge 17 is lifted clear of the bearing face 18. As it moves axially towards the rotor 2, the shoulder 16 on the member 10 comes into contact with the member 11 and carries it by telescopic action in the same direction, thus lifting the ridge 22 clear of bearing face 23 by delayed action.

The mode of operation of the sealing device is as follows:

With the pump at rest, the sealing members 10 and 11 are acted on by springs 20 and 24 respectively and are thus held with their respective ridges 17 and 22 against the bearing faces 18 and 23 of the sleeve 19, which is fast with the shaft 3. The bore 5, in which the bearings 4 and 4a are housed, is thus sealed off from the cavity 8 by the members 10 and 11. The member 11, which lies towards the counter-pump, prevents the pumped liquid present at 31 from leaking past the ridge 22, which is held in contact with the bearing face 23. The member 10 provides a seal between cavity 8 and the bore 5.

As soon as the pump shaft 3 begins to rotate, a source of pneumatic or hydraulic pressure outside the pump, or even within it (by the utilisation of pressures prevailing at certain points) forces a quantity of fluid through the passage 28 into the cavity 27 and initially thrusts back the sealing member 10, which then carries with it telescopically, when it has moved through a short distance, the sealing member 11.

From the start of the translational movement of the member 10, pressure exerted by a check fluid, consisting more particularly of gas stored in the bore 5, flows through an annular-section passage 29, between the inner surface of the member 10 and the outer face of the sleeve 19.

The nature of the gas, the pressure and the rate of flow are such as to prevent any reverse flow through passage 29 by the pumped liquid entering from a passage 30 opposite to sealing member 11, which opens into cavity 8, after the lifting of ridge 22 from its bearing face 23.

As soon as the pump reaches a certain running speed, the counter-pump 6/7, practically by itself alone, provides a seal, preventing any leakage towards a passage 31, at the rear of the counter-pump and communicating with atmosphere by way of the cavity 8 and the drainage passage 9. The flow of check fluid is reduced by passages 29 and 30 suffices to evacuate such minor traces of fluid as are present in the cavity 8.

When the pump is stopped, the process takes place in reverse and the ridges 17 and 22 of the sealing members 10 and 11 rest on their bearing faces 18 and 23 as soon as rotation ceases.

With the rotary member at rest, the seal is provided by at least one sealing member, the bearing face of which has the optimum contact pressure, the forces required not being limited, as is the case with devices hitherto proposed by the amount of wear occurring, which, in the sealing assembly here proposed, is nonexistent, as the bearing faces of the sealing members are not in contact while the shaft is rotating.

With the rotary shaft or other member in operation, the seal may be provided, on the one hand, by means of a device employing an opposing centrifugal action (repelling the fluid under pressure) and, on the other hand, by employing the dynamic action of a gas, these two actions preventing the leakage made possible by the gap between the sealing members and their seatings.

The sealing members therefore have a maximum lifetime, because operational wear is nil and the wear occurring while the shaft is at rest can be regarded as negligible.

According to the particular circumstances of use, either a perfect seal on the assembly may be imposed, in which no leakage of fluid to the exterior is tolerated—this can be achieved by applying the above method with the aid of very careful but complicated mechanical design (the counter-pump having variable performance for modification, or mounting in series)—or outward leakage during the intermediate stage between complete rest and the nominal speed of rotation may be allowed, the leakage fluid being drained off as and when required.

The movable sealing members are operated by some means of control and serve to provide a seal between the rotary shaft and the said partition when the shaft is at rest, while when the shaft is rotating (when they are moved clear of the shaft), with the device for injecting a check fluid into the open space between the sealing members and the shaft and with the counter-pump, fitted on the pump side of the sealing members, for repelling the pumped fluid.

The sequences described above are controlled by an electropneumatic device or any other device suitable for the purpose, either semiautomatic or fully automatic.

What is claimed is:

1. In a shaft assembly for substantially preventing the passage of a fluid from a first zone to a second zone,
   means between said zones and rigid with the shaft defining a first sealing surface,
   means defining a second sealing surface,
   resilient means biasing the second sealing surface into engagement with the first sealing surface when the shaft is at rest,
   means between said zones and rigid with the shaft defining a third sealing surface,
   means defining a fourth sealing surface, and
   further resilient means biasing the fourth sealing surface into engagement with the third sealing surface when the shaft is at rest,
   fluid pressure means operable during shaft rotation to disengage the said sealing surfaces, and
   pump means between said zones fast with said shaft and operable when the shaft is rotating to create fluid pressure opposing the passage of said fluid from said one zone to said second zone.

2. In an assembly according to claim 1,
   means defining a chamber containing a fluid under a pressure higher than the pressure of fluid in said first zone, said chamber being contiguous with said second zone.

3. In an assembly according to claim 1,
   a centrifugal pump impeller arranged to deliver said one fluid to said first zone.

4. In a shaft seal assembly for substantially preventing the passage of a fluid from a first zone to a second zone,
   a first generally annular member coaxial with the shaft and having an annular ridge,
   a second generally annular member coaxial with the shaft and disposed radially inwardly of the first member, said second member being capable of limited axial sliding movement relative to said first member and having an annular ridge,
   a casing surrounding said annular members, means defining two spaced generally annular sealing surfaces rigid with the shaft,
   resilient means biassing the respective ridges of the annular members into engagement with said sealing surfaces when the shaft is at rest,
   control means for overcoming the resilient means and disengaging said ridges from said sealing surfaces when the shaft is rotating,
   a fluid pump fast with said shaft arranged to discharge into said first zone and mounted for rotation relative to the casing with a clearance space,
   means defining a passage in communication with said clearance space, and
   an auxiliary pump fast with said shaft in said passage arranged to deliver fluid at at least the pressure in said clearance space.

5. An assembly according to claim 4; wherein said control means comprises:
   a fluid pressure means arranged to move said first annular member axially to disengage the ridge thereof from the corresponding said sealing surface, and
   means interconnecting said first and second annular members, whereby said second annular member is displaced axially by axial movement of said first annular member.

6. An assembly according to claim 4, comprising:
a first bellows interposed between the first annular member and the casing, and
a second bellows interposed between the second annular member and the casing.

7. An assembly according to claim 1, wherein said fluid pressure means includes a surface rigid with said means defining the second sealing surface.

8. An assembly according to claim 4, wherein said control means includes an annular surface integral with the first generally annular member.

References Cited

UNITED STATES PATENTS

| | | | |
|---|---|---|---|
| 2,300,385 | 10/1942 | Kollberg et al. | 277—65 |
| 2,465,526 | 3/1949 | Goddard | 103—111 |
| 2,698,584 | 1/1965 | Stelzer | 103—111 |

HENRY F. RADUAZO, *Primary Examiner.*